United States Patent [11] 3,578,917

[72] Inventors Charles Henri Emile Grandjean
Villejuif, (Val-de-Marne);
Jean Perrault, Port-Marly, (Yvelines),
France
[21] Appl. No. 833,579
[22] Filed June 16, 1969
[45] Patented May 18, 1971
[73] Assignee International Standard Electric Corporation
New York, N.Y.
[32] Priority June 18, 1968
[33] France
[31] 155361

[54] SECURITY CIRCUIT FOR MULTI-EXCHANGE TELECOMMUNICATION NETWORK
5 Claims, 2 Drawing Figs.

[52] U.S. Cl. 179/18
[51] Int. Cl. H04q 3/56
[50] Field of Search 179/18.21

[56] References Cited
UNITED STATES PATENTS
3,524,940 8/1970 Edstrom 179/18EA
FOREIGN PATENTS
803,621 1/1969 Canada 179/18(.21)

*Primary Examiner*—William C. Cooper
*Attorneys*—C. Cornell Remsen, Jr., Walter J. Baum, Delbert P. Warner and James B. Raden

ABSTRACT: In a telephone exchange comprising a central processor serving several satellite exchanges, a satellite is completely blocked when the cable which connects it to the processor is out of order. According to the invention, each pair of satellites is interconnected by means of a single communication channel so that the transfer of data between the processor and the satellite whose cable is out of order may be effected via another satellite.

SECURITY CIRCUIT FOR MULTI-EXCHANCE TELECOMMUNICATION NETWORK

The present invention concerns a security circuit for a switching network comprising several distant satellite exchanges connected to a centralized control unit by data transmission links and, more particularly, a telephone exchange in which the control unit controls the processings of all the calls originating from subscriber's lines connected to the satellites.

It is known that the present tendency, in the achievement of telephone exchanges operating in space multiplex or in time multiplex, consists in carrying out all the operations concerning a call and the setting up of a link between the calling and the called subscriber under the control of a centralized control unit or central processor, in which the elementary operations are performed at a very high speed, so that said unit may carry out simultaneously, and in real time, all the operations concerning an important traffic.

Whatever may be the type of switching used—space or time switching—this latter is carried out through several selection stages connected in series and enabling to obtain the required degree of concentration.

On the other hand, when a telephone exchange is used in rural zones with low telephone density, it is interesting to carry out a concentration of lines at the departure of each city or of each group of subscribers.

To this effect, it is known to achieve a telephone exchange comprising, on the one hand, a main center grouping the central processor and a part of the selection stages, and on the other hand, *m* satellites exchanges in which are located the remaining part of the selection stages (primary selection) and the line scanning circuit. Each satellite is connected to the main center by a cable assuring several transmission channels, each channel enabling the bidirectional transfer of data or speech. One, at least, of these channels is used for data transmissions between the main center and the satellite.

In an arrangement of this type, if the cable connecting these two units is cut out, or if a disturbance occurs in the chain of repeaters (case of a PCM transmission), the satellite is completely blocked and the subscribers it serves can no more obtain any communication.

In the present invention, provision has been made for a security circuit which is put into service when an outage of this type occurs and which acts in such a way as the subscribers connected to the satellite may still obtain local communications. This security circuit, remote controlled from the main center, requires, as additional equipment, only the addition of $m/2$ data transmission channels used as emergency channels, each of these channels connecting two satellites S*j* and S*k*. This is based on the assumption that the number *m* is even. In the opposite case, the same result is obtained in setting up $m-1/A2$ emergency channels between pairs of satellites, the remaining satellite being connected by an additional emergency channel to one of the satellite of a pair.

Thus, when the cable connecting the satellite S*j* to the main center is cut out, this latter sets up again the data transmission link via one channel of the cable which connects it to the satellite S*k* and the emergency channel connecting the two satellites.

The object of the present invention is thus to achieve, in an exploded switching network, a security circuit enabling to process the local traffic of a satellite exchange when the cable which connects it to the main center is cut out or faulty.

A feature of the invention is that, in an exploded switching network comprising a main center P and *m* satellites exchanges (*m* being an even number) connected individually to the center P by a cable comprising one normal service channel NS and *n* speech channels TC1, TC2... TC*n*, each pair of satellites S*j* and S*k* is connected by an emergency channel HS: that, in each satellite, one places a security circuit comprising two relays R*a* and R*b* normally open, the relay R*b* being closed when a switching message sent by the center P is received on the channels NS and the relay R*a* being closed when a carrier frequency sent by the center P is received on the channel HS and that both relays receive an opening control (order) when a clearing message is received on one of the channels NS or HS.

Another feature of the invention is that, when the cable connecting the satellite S*j* to the center P is cut out, a switching message is sent to the satellite S*k*; that the closing of the relay R*b* in this satellite connects the channel HS to one of the speech channels—the channel TC1 for instance—which is thus used as an additional service channel for connecting the center P to the satellite S*j*; that a carrier frequency is sent afterwards by the center P on the channel TC1; that this carrier frequency is decoded in the satellite S*j* and that the signal thus obtained controls the closing of the relay R*a* which disconnects the central processor CP from the channel NS which cannot be used anymore and connects it to the channel HS in such a way as the satellite S*j* is connected to the main center P by a service link enabling to set up its local traffic.

Another feature of the invention is that, if *m* is an odd number, one constitutes $m-1/2$ pairs of satellites; that the remaining satellite S*x* is connected to one of the satellites of one pair, S*j* for instance, by an emergency channel; that the security circuit of this satellite S*j* comprises an additional relay R*b* assuring the connection of one of the speech channels, TC2 for instance, over the channel HS connecting the satellites S*j* and S*x* and that the satellite S*x* comprises a security circuit in which only the relay R*a* is used.

The above-mentioned and other features and objects of this invention will become apparent by reference to the following description taken in conjunction with the accompanying drawings in which.

Figure 1:
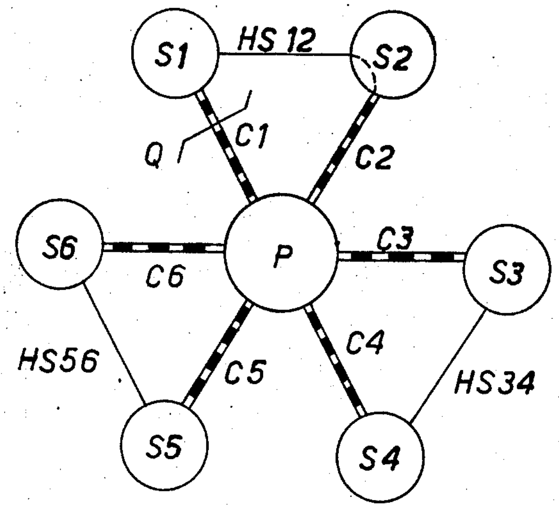
FIG. 1 represents the general diagram of a telecommunications network.

FIG. 1 represents the general diagram of a telecommunications network comprising the main center P and the satellites exchanges S1 to S6 connected to the main center by the multiple channel cables C1 to C6. The satellites are connected in pairs by one-channel cables such as HS12, HS34, HS56 used as emergency channels. If the cable C1 is out of use, due for instance to a cut out at the point Q, an order sent from the main center P controls the setting up, in the satellite S2, of an emergency link between one channel of the cable C2 used as additional service channel and the cable HS12. One has thus reestablished service connection between the center P and the satellite S1 which enables to service local calls.

Figure 2:
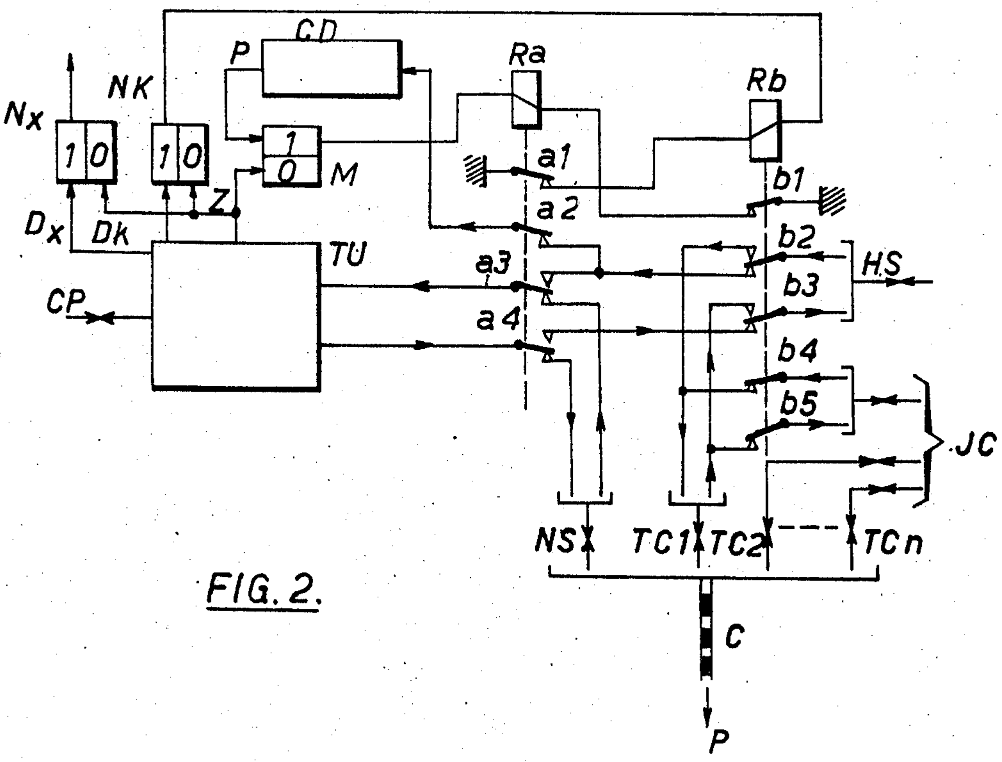
FIG. 2 represents the detailed diagram of the security of circuits located in a satellite exchange.

FIG. 2 represents the detailed diagram of the circuits associated to each satellite station and which are remote controlled from the main center P. This remote control acts over the relays R*a* (comprising the contacts *a*1, *a*2, *a*3, *a*4) and R*b* (comprising the contacts *b*1, *b*2, *b*3, *b*4, *b*5) which are open in normal operation. The multiple channel cable C comprises a service channel NS and *n* speech channels TC1, TC2 ... TC*n*. The channels TC2 to TC*n* are connected permanently to the input circuit of the satellite JC which is not shown on the FIG., and the channel TC1 is normally connected to this circuit except when it is used as additional service channel by the closing of the relay R*b* which assures its connection to the emergency channel HS (switching of the contacts *b*2 and *b*3).

Besides the relays mentioned hereabove, the following circuits are represented on the FIG.:

- The transmission unit TU which is connected, in normal operation, to the service channel NS. This circuit comprises the decoding circuits enabling to convert the service information received over the channel NS into logic signals used in the circuit CP which groups the line scanning circuit and the primary selection stage circuit. This unit TU achieves the conversion in the reverse direction for transmitting to the main center P several informations such as the results of the line scanning.

The unit TU may receive, besides, special messages concerning the setting up and the breaking of emergency links between the satellites of a pair. These are:

a) the switching message which is decoded as a signal D$k$ which controls the setting to 1 state of the flip-flop N$k$ and the closing of the relay R$b$;

b) the clearing message which is decoded as a signal Z applied to the O input of the flip-flops M and N$k$.

The carrier detection circuit CD which delivers a signal P when a low frequency carrier is received on the channel HS. This signal P controls the setting to the 1 state of the flip-flop M and, consequently, the closing of the relay R$a$.

The operation of these circuits will be now described.

When a cut out Q is detected over the cable C1 (see FIG. 1), the operator of the main center P controls the transmission of a switching message towards the satellite S2, this message being sent over the channel NS of the cable C2. Since the relay R$a$ of satellite S2 is normally open, the message is forwarded to its transmission unit TU and a signal D$k$ appears which controls the setting to the 1 state of the flip-flop N$k$ and the closing of the relay R$b$. The channel TC1 is then connected to the emergency channel HS12 (contacts $b2$, $b3$) and it is no more connected to the input circuit JC (contacts $b4$, $b5$). It will be noted that the relay R$a$ remaining open, the normal service channel NS is always connected to the transmission unit TU and that the satellite S2 continues to operate normally.

After the switching message, the main center P sends a carrier frequency over the channel TC1 of the cable C2. This signal is transmitted to the satellite S1 through the channel HS12.

In this satellite S1, the signal is received over the channel HS12, and since the relays R$a$ and R$b$ are open, it is transmitted through the contacts $a2$ and $b2$ to the carrier detection circuit CD. The signal P which appears controls the setting to the 1 state of the flip-flop M and the closing of the relay R$a$. The emergency channel HS is then connected to the transmission circuit TU (contacts $a3$, $a4$) so that a service path is set up between the main center P and the circuit CP of the satellite S1 through the following circuits:

Additional service channel TC1 of the cable C2;

Connection, in the satellite S2, of the channel TC1 to the emergency channel HS12; this connection being carried out by the closing of the relay R$b$;

Connection, in the satellite S1, of the channel HS12 to the transmission unit TU; this connection being carried out by the closing of the relay R$a$ of the satellite S1.

When the cable C1 is repaired, the center P sends, over the channels NS and TC1 of the cable C2, a clearing message.

This message, sent over the channel NS, is transmitted to the unit TU of the satellite S2 which delivers a signal Z controlling the resetting of flip-flop N$k$ and the opening of the relay R$b$, this latter being carried out with a certain time delay due to the decoding time in the unit TU and to the switching time of the flip-flop N$k$. the opening of the relay R$b$, Before the opening of this relay, the message sent over the channel TC1 is transmitted to the satellite S1 by the channel HS12 and it is applied to the unit TU which delivers then a signal Z controlling the resetting of the flip-flop M and the opening of the relay R$a$.

The contacts $a1$ and $b1$ achieve an interlocking of the relays R$a$ and R$b$ for avoiding their simultaneous closing.

The above description has been made by assuming, according to FIG. 1, that the network comprises an even number of satellite stations.

The security circuit according to the invention may also be used in a network comprising an odd number $m$ of satellites by grouping (m−1) satellites by pairs and by connecting the remaining satellite S$x$ to the satellite S$j$ of one pair of S$j$—S$k$ by means of an additional emergency channel.

In these conditions, one adds in the security circuit of the satellite S$j$, a second relay R$b$ controlled by a flip-flop N$x$ (see FIG. 2) which is set to the 1 state by a signal D$x$. It is thus seen that the main center P must send to S$j$ two different switching messages according to whether the cable cut out is that which connects it to S$x$ or to S$k$, the signal delivered by the circuit TU of the satellite S$j$ being respectively D$x$ or D$k$.

On the other hand, the security circuit of the satellite S$k$ comprises only the relay R$a$; the carrier detection circuit CD, the relay M and the transmission unit TU.

While the principles of the above invention have been described in connection with specific embodiments and particular modifications thereof it is to be clearly understood that this description is made by way of example and not as a limitation of the scope of the invention.

We claim:

1. A telecommunications network comprising a main switching center having a data processor thereat, a plurality of satellite exchanges, means at each of said satellite exchanges operated responsive to commands from the data processor, a separate multichannel cable connecting each to said main center, one of the channels of each cable being a service channel reserved for the interchange of information between said data processor and equipment at the satellite exchange served by the cable carrying the service channel, a cable connecting one of said satellite exchanges to another one of said exchanges, and means at one satellite exchange responsive to a signal received over the service channel from said main center indicating a trouble condition between said center and another satellite exchange for coupling said main center through said one satellite exchange to said other satellite exchange over said cable.

2. A network as claimed in claim 1, wherein said satellite exchanges are connected in pairs with an emergency service channel running between the paired satellite exchanges.

3. A network as claimed in claim 1, wherein said satellite exchanges are interconnected in groups of three by two emergency channels when there are an even number of satellite exchanges.

4. A network as claimed in claim 1, wherein other of said channels of each cable comprise voice channels, and said coupling means include switching means at said one satellite exchange responsive to said trouble on a service channel between the main center and said other satellite exchange for remotely operating said switching means to connect one of the voice channels at said one satellite exchange to an emergency service channel between said one and said other satellite exchanges for thereafter transmitting data between said main center and other first satellite exchange via said emergency service channel and said connected voice channel.

5. A network as claimed in claim 1, further including reset means at said one satellite responsive to a signal from said main center for resetting said coupling means to decouple said one exchange from said other.